United States Patent [19]

Hewitt et al.

[11] 4,262,531

[45] Apr. 21, 1981

[54] FLUID-GAUGING METHODS AND SYSTEMS

[75] Inventors: Martin Hewitt, Basingstoke; David Sinclair, Camberley, both of England

[73] Assignee: Smiths Industries Limited, London, England

[21] Appl. No.: 79,868

[22] Filed: Sep. 28, 1979

[30] Foreign Application Priority Data

Oct. 2, 1978 [GB] United Kingdom ............... 38996/78

[51] Int. Cl.³ ............................................. G01F 23/26
[52] U.S. Cl. ..................................... 73/304 C; 73/149
[58] Field of Search ..................... 73/304 C, 32 R, 149

[56] References Cited

U.S. PATENT DOCUMENTS

| | | | |
|---|---|---|---|
| 3,037,385 | 6/1962 | Franzel et al. | 73/304 C |
| 3,112,647 | 12/1963 | Sontheimer | 73/304 C |
| 3,596,517 | 8/1971 | Ryder | 73/304 C |
| 3,620,080 | 11/1971 | Ryder | 73/304 C |
| 3,728,897 | 4/1973 | Wallman | 73/304 C |

Primary Examiner—Gerald Goldberg
Assistant Examiner—Joseph W. Roskos
Attorney, Agent, or Firm—Pollock, Vande Sande & Priddy

[57] ABSTRACT

A system for indicating the mass of fuel in several fuel tanks of an aircraft has a capacitive depth sensor and a permittivity cell located in each tank. Signals from the sensors and cells are supplied to a computing unit which computes the volume of fuel in each tank and its approximate density. The system has a densitometer and another permittivity cell which receive a sample of all the fuel supplied to the tanks, and supply output signals to the computing unit. The computing unit derives a correction factor by comparing an approximate value of density derived from the other permittivity cell with a more accurate measure of density derived from the densitometer. The correction factor is used to correct the approximate values of density derived from the permittivity cell in each tank. A correction factor is calculated in respect of every batch of fuel supplied to the tanks and a combined correction factor is calculated for the mixture in each tank, from the volumes and respective correction factors of the constituent fuels.

14 Claims, 3 Drawing Figures

FLUID-GAUGING METHODS AND SYSTEMS

BACKGROUND OF THE INVENTION

This invention relates to fluid-gauging systems and fluid-gauging methods.

The invention is especially, but not exclusively, concerned with fuel-gauging systems for aircraft.

Measurement of the quantity of fuel within an aircraft's fuel-tanks is commonly performed by means of one or more capacitive probes arranged for immersion in any fuel present. The capacitance of the probe varies in accordance with the depth of fuel in the tank, thereby enabling an indication of fuel level to be obtained. Changes in permittivity of fuel which would affect the capacitance of the probe can be compensated for by use of a permittivity cell (which may be in the form of a parallel-plate capacitor of open construction) mounted at the bottom of the fuel-tank, so as always to be immersed in any fuel present. An indication of volume may be obtained directly if the tank is of a regular shape, that is, if the volume of fuel present varies in a linear fashion with the depth of fuel. For irregularly shaped tanks the probe may be characterised, that is, the probe plates may be suitably-shaped such that the surface area of the plates covered by fuel varies in a non-linear fashion with depth but in a manner that is directly related to the volume of fuel present. Alternatively, the output of the probe may be supplied to a computer in which is stored a model of the fuel-tank from which can be obtained an indication of the volume with knowledge of the fuel depth.

In many applications, such as, for example, in aircraft, it is necessary to have an indication of the fuel mass rather than its volume. Although the mass of fuel can be readily determined by measuring its density with some form of densitometer, the cost of densitometers capable of providing the high accuracy needed in some applications can be very high. Most modern aircraft are equipped with several fuel-tanks and, because of the variations in density between different fuels, such as might be supplied to different tanks during refuelling stops at different airports, it is necessary to obtain a measure of the density of each of the different fuels and fuel mixtures within the different tanks. The cost of providing a fuel-gauging system having a densitometer mounted in each of an aircraft's fuel-tanks will therefore be correspondingly high, and, in many cases prohibitive.

To avoid the need to use densitometers, it has been proposed instead to measure the permittivity of fuel with a relatively simple and inexpensive capacitive permittivity cell and to derive the density from the permittivity using a relationship of the form:

$$D_K = (K-1)/0.763(0.7 + 0.2(K-1)) \quad \ldots (1)$$

where
$D_K$ is the density of the fuel; and
$K$ is the permittivity of the fuel.

Since the permittivity cells can be relatively inexpensive, it is possible to mount a cell in every tank and thereby compensate for fuels of different densities. The above relationship, however, is only approximate; random variations from fuel to fuel mean that errors of up to about 2% can be experienced. In the future, with fuels derived from an increasing number of sources, it is likely that even greater errors may be experienced.

Although a fuel-gauging system of such limited accuracy may be satisfactory in some cases, the need to carry more fuel than is absolutely necessary, in order to allow sufficient safety margin for inaccuracies in the system, will mean that the payload that can be carried by the aircraft must be correspondingly reduced.

BRIEF SUMMARY OF THE INVENTION

It is an object of the present invention to provide a fluid-gauging system and method that may be used to alleviate the above-mentioned difficulties.

According to one aspect of the present invention there is provided a fluid-gauging system for use in providing a representation of the mass of fluid present in a plurality of reservoirs, the system including means for providing a representation of the volume of fluid present in each said reservoir, first means associated with each said reservoir for providing a first representation of the density of fluid in each said reservoir, second means for providing a second representation of the density of fluid, said second representation being more accurate than said first representation, and means for modifying each said first representation in accordance with said second representation so as thereby to obtain a more accurate representation of the density of fluid in each said reservoir.

The second means providing the second density representation may receive a sample at least of all the fluid supplied to the reservoirs. The first means may include means located in each reservoir for providing a first representation of the permittivity of fluid in each reservoir, and means for deriving, from said first permittivity representations, said first density representations. The system may further include third means for providing in respect of fluid supplied to said reservoirs, a second permittivity representation, and means for deriving, from said second permittivity representation, a third density representation.

The system may include means for comparing said second density representation with said third density representation so as to derive a correction factor therefrom for use in modifying each said first density representation. The system may be arranged to derive a first correction factor in respect of a first fluid supplied to said reservoirs, said first correction factor being stored in store means, the system being arranged to derive a second correction factor in respect of a second fluid supplied to said reservoirs, and a third correction factor in respect of each said reservoir in accordance with the volumes of said first and second fluids in each said reservoir and their respective correction factors, each said first density representation being modified by use of said third correction factor.

According to another aspect of the present invention there is provided a method of providing an indication of the mass of fluid present in a plurality of reservoirs, said method including the steps of deriving a representation of the volume of fluid in each said reservoir, deriving a first representation of the density of fluid in each said reservoir, deriving a second representation of the density of fluid, said second density representation being more accurate than said first density representation, and modifying each said first density representation in accordance with said second density representation so as thereby to obtain a more accurate representation of the density of fluid in each said reservoir.

A fuel-gauging system and method for an aircraft, in accordance with the present invention, will now be described, by way of example, with reference to the accompanying drawings.

DETAILED DESCRIPTION

Figure 1:
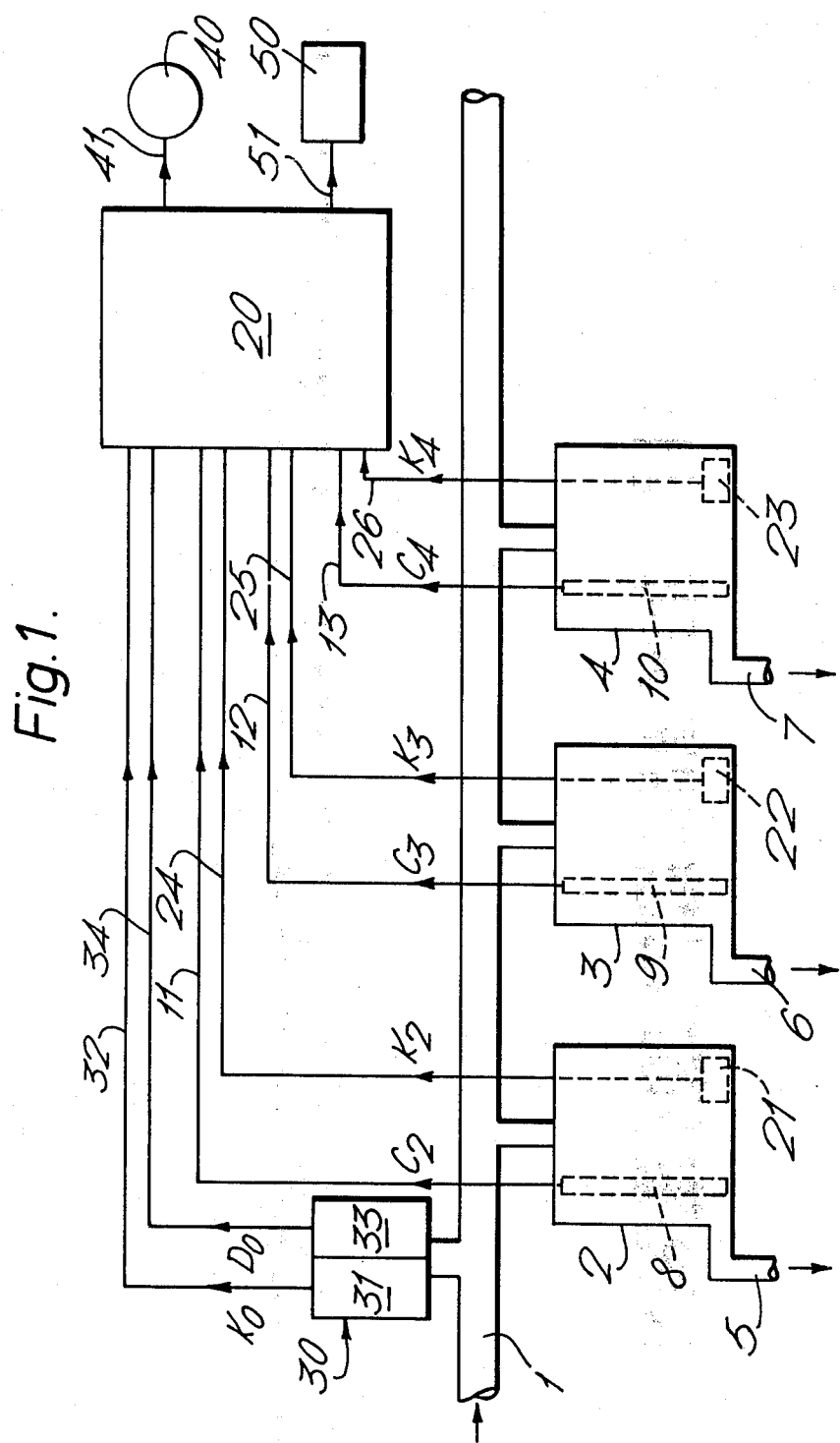
FIG. 1 is a schematic representation of the system.

With reference to FIG. 1, an inlet pipe 1 is connected to supply fuel to fuel-tanks 2, 3 and 4 (only three of which are shown in FIG. 1) mounted within the aircraft. Fuel is supplied to the aircraft engine (not shown) via outlet pipes 5, 6 and 7 extending from the bottom of each of the fuel-tanks 2, 3 and 4 respectively. Capacitive level probes 8 to 10 are mounted vertically within the tanks 2 to 4 and provide output signals $C_2$, $C_3$ and $C_4$ respectively representative of the values of capacitance of the probes, which signals vary in accordance with fuel depths within the tanks. The signals $C_2$, $C_3$ and $C_4$ are supplied via lines 11 to 13 to a computing unit 20 which derives a measure of the volume of fuel in each tank.

Figure 2:
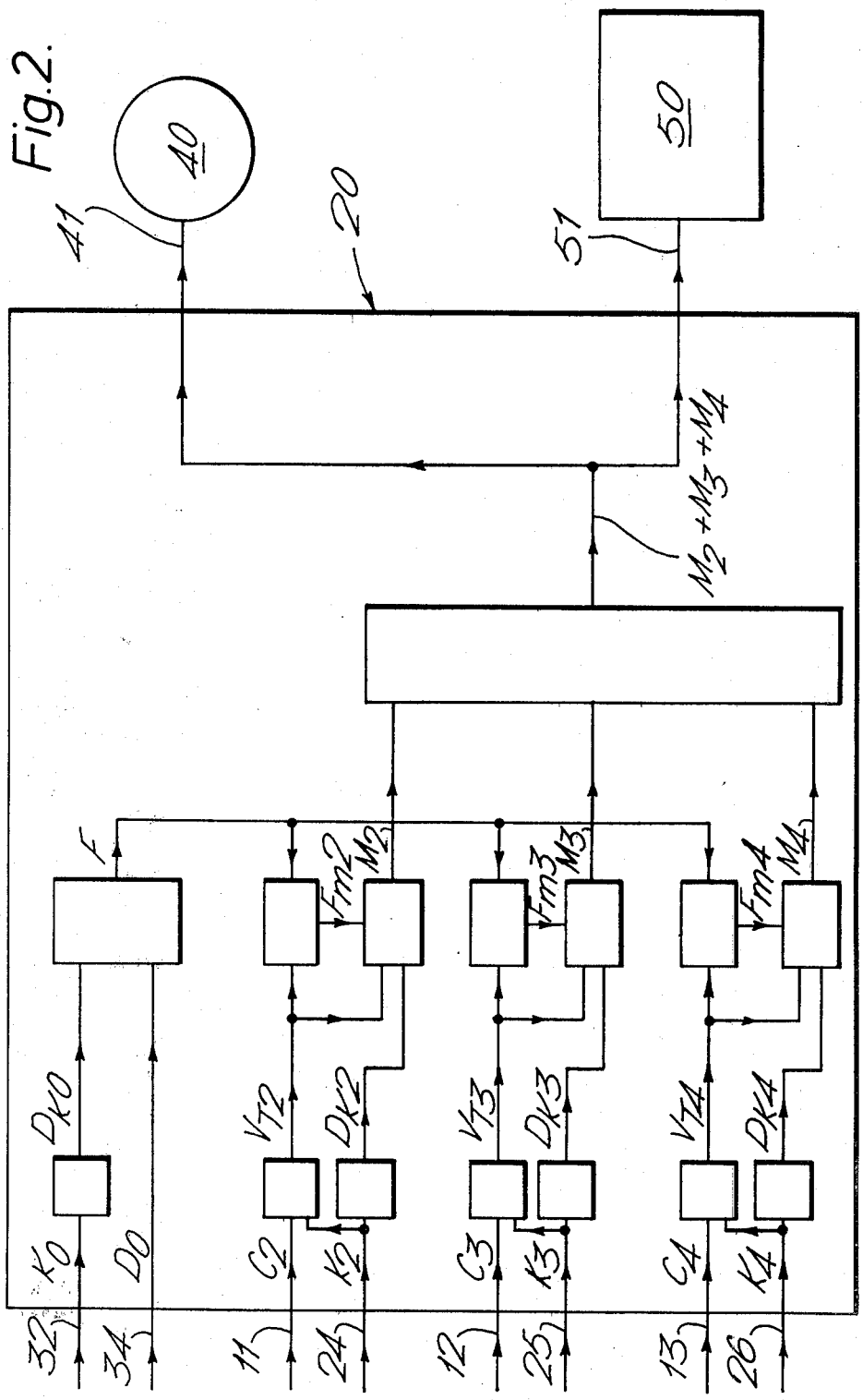
FIG. 2 is a schematic representation of a part of the system of FIG. 1.
Figure 3:
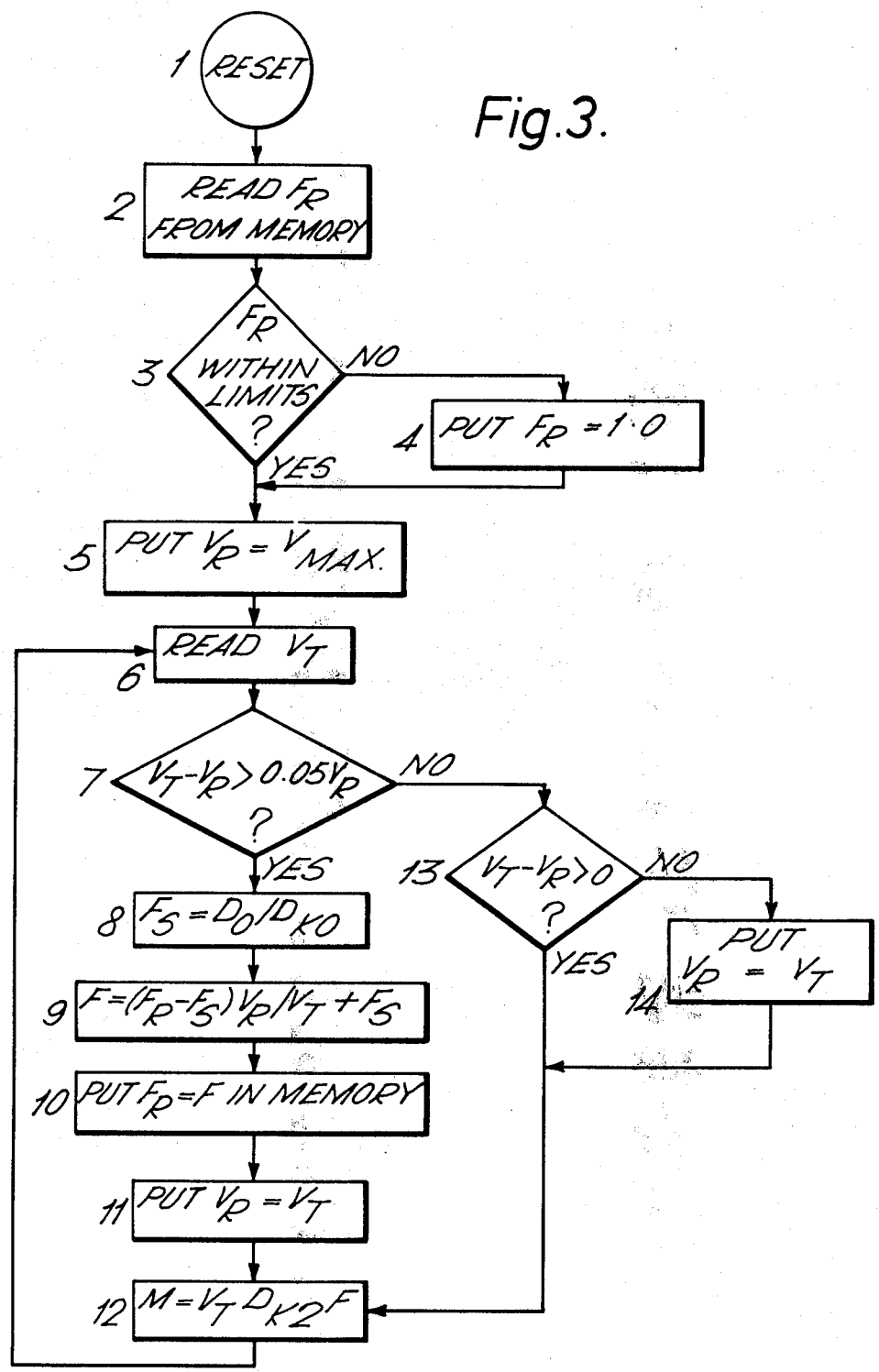
FIG. 3 is a flow chart indicating operation of the method and system.

A permittivity cell 21 to 23 is also mounted within each of the tanks 2 to 4 respectively. The cells 21 to 23 may each take the form of a simple parallel-plate capacitor of open construction that is mounted at the bottom of the fuel-tank so that it is always totally immersed in any fuel that may be present. The capacitances of the cells 21 to 23 vary in accordance with the permittivity $K_2$, $K_3$ and $K_4$ of the fuel between their plates; output signals representative of these values of permittivity are supplied via lines 24 to 26 respectively to the computing unit 20. With reference now also to FIG. 2, the computing unit 20 is arranged to compute approximate values of the densities $D_{K2}$, $D_{K3}$, $D_{K4}$ of fuel in the tanks 2, 3 and 4 by substituting the values $K_2$, $K_3$ and $K_4$ of the permittivity respectively in the expression (I). The values $K_2$, $K_3$ and $K_4$ of the permittivity of the fuel are also used to compensate for changes in permittivity affecting the capacitive probes 8 to 10.

Fuel from the inlet pipe 1 is also supplied to a sensor unit 30 which is located at a point along the inlet pipe upstream from the fuel-tanks 2 to 4. The sensor unit 30 is so arranged that all the fuel (or a sample of all the fuel) supplied to the aircraft passes through the unit prior to being supplied to any of the tanks 2 to 4. The unit 30 includes a permittivity cell 31 which may be of a similar form to the cells 21 to 23 mounted in the tanks, and which is arranged to supply signals via line 32 to the computing unit 20 representative of the permittivity $K_0$ of the fuel supplied to the aircraft. The sensing unit 30 also includes a densitometer 33 that is arranged to supply signals representative of the fuel density $D_0$ via line 34 to the computing unit 20. The densitometer 33 may be of any of the suitable known forms, such as, for example, give an indication of density by measuring the position of a float, or the resistance to movement of a rotating paddle or a vibrating element (such as, a vibrating cylinder), or by detecting changes in optical properties of the fluid. The densitometer 33 may readily provide a measure of the density of fuel supplied to the aircraft which is accurate to within about 0.15%.

The computing unit 20 also derives an approximate indication $D_{K0}$ of the density of fuel supplied to the aircraft, using the expression (I) and substituting for K, the value $K_0$ derived by the permittivity cell 31.

The density $D_{K0}$ derived from the permittivity cell 31 using expression (I) is related to the actual density $D_0$ derived from the densitometer by the relationship:

$$D_0 = D_{K0} F \qquad \ldots \text{(II)}$$

where F is a correction factor.

This correction factor F is used to modify the approximate values $D_{K2}$, $D_{K3}$ and $D_{K4}$ of the densities derived from the permittivity cells 21, 22 and 23 so as thereby to give a more accurate measure of the densities. A more accurate measure could be derived simply by using a product of the approximate values $D_{K2}$ to $D_{K4}$ with the correction factor F. Since the permittivity cells 21 to 23 can measure permittivity to within about 0.2% and the densitometer 33 can measure density to within about 0.15%, an overall accuracy of $(0.2^2 + 0.15^2)^{\frac{1}{2}}$ or 0.25% may be derived. As can be seen, therefore, this arrangement can give a substantial improvement on the 2% accuracy derived using the permittivity cells alone, without the expense of providing an individual densitometer for each tank.

This simple use of the correction factor can be satisfactory where the fuel in each tank is the same and the variations in density are attributable solely to variations in temperature between the tanks. The accuracy is, however, severely reduced where different fuels are present in different tanks since the single densitometer enables a correction factor for only one particular fuel to be derived at any one time. In practice, prior to each refuelling, some tanks may be empty, some full, and others partly full. After refuelling with a different fuel the tanks will each have different mixtures of fuel. A more detailed consideration of the present invention will demonstrate how this problem is overcome.

Since the sensor unit 30 is located along the inlet pipe 1 upstream of the tanks 2 to 4 it receives only fuel which is supplied to the aircraft at each refuelling and does not therefore provide an indication of the properties of any mixtures of fuel resulting from successive refuellings.

Initially, assuming all the tanks 2 to 4 are empty, the same fuel is supplied to fill all the tanks, and the densitometer 33 and permittivity cell 31 of the sensor unit 30 supply signals $D_{01}$ and $K_{01}$ to the computing unit 20 in accordance with the density and permittivity respectively of this fuel. The computing unit 20 derives an approximate value $D_{K01}$ of the density by substituting the value $K_{01}$ of the permittivity in the expression (I). The computing unit 20 then substitutes this approximate value $D_{K01}$ and the value of density $D_{01}$ derived from the densitometer 33 into expression (II) to give:

$$F_1 = D_{01}/D_{K01} \qquad \ldots \text{(III)}$$

where $F_1$ is the correction factor for the first fuel and is the same for each of the tanks 2 to 4. This correction factor $F_1$ is used by the computing unit 20 in calculations of fuel quantity in the tanks 2 to 4 until such time as the aircraft should be next refuelled.

At the next refuelling stop, some of the original fuel will have been expended and the levels in the tanks 2 to 4 will have fallen. The volume of original fuel still present in each tank is measured using the capacitance probes 8 to 10. For ease of understanding, only the behaviour of one tank 2 will be considered but it will be appreciated that the quantity of fuel in the other tanks may be determined in a similar manner.

New fuel is supplied to the aircraft through the inlet pipe 1, the sensor unit 30 supplying signals indicative of its density $D_{02}$ and permittivity $K_{02}$ to the computing unit 20 which in turn derives a new correction factor $F_2$ for the new fuel. The new fuel is supplied to the tanks where it is mixed with the remaining original fuel. The correction factor $F_m$ for the mixture of fuel in tank 2 is given by the expression:

$$F_m = (V_1 F_1 + V_2 F_2)/(V_1 + V_2) \quad \ldots \text{(IV)}$$

where $V_1$ is the volume of original fuel remaining in the tank 2; and $V_2$ is the volume of new fuel supplied to the tank 2.

The total volume of fuel $V_T$ in the tank 2 after refuelling is given by:

$$V_T = V_1 + V_2 \quad \ldots \text{(V)}$$

Removing $V_2$ from (IV) gives:

$$F_m = (F_1 - F_2) V_1 / V_T + F_2 \quad \ldots \text{(VI)}$$

The correction factor $F_m$ for the fuel mixture is computed by the computing unit 20 using expression (VI) and this correction factor is used, together with the approximate measure of density derived from the permittivity of the fuel mixture, to provide a measure of the density of the fuel mixture within tank 2. The correction factor $F_m$ is used by the computing unit 20 in calculations of the fuel quantity in the tank 2 until the aircraft is next refuelled.

The value of the correction factor $F_m$ is stored in the computing unit 20 and is used in expression (VI) upon next refuelling to give:

$$F_m' = (F_m - F_3) V_T' + F_3 \quad \ldots \text{(VII)}$$

where $F_m'$ is the correction factor of the new mixture;

$F_3$ is the correction factor of the fuel supplied at the next refuelling;

$V_3$ is the volume of fuel remaining in tank 2 prior to next refuelling; and $V_T'$ is the total volume of fuel after next refuelling.

In this way, it is possible to derive a new correction factor for the fuel mixture upon every refuelling occasion from a knowledge of the volume of fuel before and after refuelling, the correction factor of the new fuel and the correction factor of the fuel in the tank prior to refuelling. It is important therefore that the value of the correction factor prior to refuelling is stored in a non-volatile memory, that is, a memory which retains its stored information even when it is not supplied with power. Thus, at the end of a flight, if the fuel-gauging system is turned off, it will retain knowledge of the correction factor for use when the aircraft is subsequently refuelled. It is not necessary to retain knowledge of fuel volume after the system has been switched off since refuelling would not normally occur until after the system had been switched on again, at which time the volume of fuel could be remeasured.

As a precaution against erasure of the memory within which the correction factor is stored, the computing unit 20 is arranged to substitute a value of 1.0 if the stored value of the factor falls outside prescribed limits thereby indicating that erasure may have occurred. Initially, therefore, the system will function with the value of the fuel density being derived solely from the permittivity cells 21 to 23 in accordance with expression (I) and with an accuracy of only about 2%. Upon refuelling, however, the correction factor for the incoming fuel is employed in calculation of the density of the new mixture and the error in the value of the correction factor of fuel remaining in the tank is reduced in accordance with the ratio of the volume of new fuel supplied to the tank, to the volume of old fuel remaining in the tank.

The sensor unit 30 may only be immersed in fuel when fuel is actually being supplied to the aircraft and, for this reason, it is arranged that the output signals from the sensor unit are only employed in calculation of the correction factors when refuelling is actually in progress. In practice, the volume of fuel in each of the tanks 2 to 4 is measured repeatedly many times a second, rather than continuously. If the fuel volume has increased by more than a prescribed percentage, the computing unit 20 concludes that refuelling is occurring and calculates the fuel correction factor for the incoming fuel from the outputs of the densitometer 33 and permittivity cell 31. When successive measurements of the volume of fuel in the tank show that refuelling has stopped—that is, when the volume measurements are the same as or less than preceding volume measurements—the new correction factor is employed in the calculation of fuel density until the next refuelling occurs.

The computing unit 20 derives an indication of the mass of fuel $M_2$ in the tank 2 at any particular time in accordance with the expression:

$$M_2 = V_{T2} D_{K2} F_2 \quad \ldots \text{(VIII)}$$

where $V_{T2}$ is the total volume of fuel in tank 2 at that time;

$D_{K2}$ is the value of density as derived from the permittivity using expression (I); and $F_2$ is the correction factor for the particular mixture in tank 2 at that time.

The mass of fuel $M_3$ and $M_4$ in the other tanks 3 and 4 is similarly computed and added together to give a measure of the total mass of fuel on the aircraft. Signals representative of this total mass are supplied to a display unit 40 via line 41 and to a fuel-management unit 50 via line 51. If desired, separate indications of the amount of fuel in each tank could be provided on separate display units.

It will be appreciated that various alternative arrangements for measuring the height of fuel in the tanks could be used in place of capacitive sensors. In this respect, optical, thermal, ultrasonic or other electrical sensors could be used.

A flow chart illustrating operation of the system for fuel-tank 2 is shown in FIG. 2. For the purpose of this flow chart the correction factor used in calculation of the mass M of fuel is given the letter F, the correction factor derived from the sensing unit 30 is denoted $F_S$, the correction factor of the fuel remaining in the tank prior to refuelling is denoted $F_R$, and the volume of fuel remaining in the tank prior to refuelling is denoted $V_R$. This gives, from expression (VI):

$$F = (F_R - F_S) V_R / V_T + F_S \quad \ldots \text{(IX)}$$

At the start of operation of the method, the value $V_R$ would normally assume some random value. The first measure of the volume of fuel $V_T$ in the tank at start of operation might therefore be greater than $V_R$ in which case the computing unit 20 would conclude that refuelling was taking place, even if in reality no fuel has been added to the tank following the previous cessation of operation. The effect of this would be that the computing unit 20 would derive a new value of the correction factor from the sensor unit 30, even though this might not be immersed in fuel, and would thereby cause errors in the computation of fuel density. To avoid such errors arising, at the start of operation (stage 5) $V_R$ is put equal to $V_{max}$, that is, the maximum volume of fuel that could be contained in the tank. On the first cycle or performance of the method, the actual volume $V_T$ of fuel present will be less than or equal to this maximum volume and the computing program will therefore go from stage 7 to stages 13 and 14, so as to replace $V_R$ by $V_T$ for the second cycle.

On the second cycle, if the volume of fuel $V_T$ at the time of the second cycle is more than 5% greater than the volume of fuel $V_R$ at the time of the previous cycle the computing unit 20 concludes (at stage 7) that refuelling is taking place and the correction factor is therefore updated (during stages 8 to 11) in accordance with the density of the new fuel being added.

We claim:

1. A fluid-gauging system of the kind for providing a representation of the mass of fluid present in a plurality of reservoirs, the system including means for providing a representation of the volume of fluid present in each said reservoir, first means associated with each said reservoir for providing a first representation of the density of fluid in each said reservoir, and means for deriving the mass of fluid from said volume representations and said density representations, the improvement wherein the system includes second means for providing a second representation of the density of fluid, said second representation being more accurate than said first representation, and means for modifying each said first representation in accordance with said second representation so as thereby to obtain a more accurate representation of the density of fluid in each said reservoir.

2. A fluid-gauging system according to claim 1, including means mounting said second means to receive a sample at least of all the fluid supplied to said reservoirs.

3. A fluid-gauging system according to claim 2, wherein each said first means includes permittivity sensor means located in each said reservoir for providing a first representation of the permittivity of fluid in each said reservoir, and wherein said system includes computing means for deriving, from said first permittivity representation, said first density representation.

4. A fluid-gauging system according to claim 3, including third means for providing, in respect of fluid supplied to said reservoirs, a second permittivity representation, wherein said computing means includes means for deriving a third density representation from said second permittivity representation.

5. A fluid-gauging system according to claim 4, wherein said second and third means are mounted together upstream along a fluid inlet conduit making connection with said reservoirs.

6. A fluid-gauging system according to claim 4, wherein said system includes comparator means for comparing said second density representation with said third density representation and deriving a correction factor therefrom, and means for modifying each said first density representation in accordance with said correction factor.

7. A fluid-gauging system according to claim 6, including store means for storing said correction factor.

8. A fluid-gauging system according to claim 7, wherein said comparator means derives a first correction factor in respect of a first fluid supplied to said reservoirs, said first correction factor being stored in said store means, and a second correction factor in respect of a second fluid supplied to said reservoirs, wherein said computing means includes means for deriving a third correction factor in respect of each said reservoir in accordance with the volumes of said first and second fluids in each said reservoir and their respective correction factors, and wherein said computing means modifies each said first density representation by use of said third correction factor.

9. A fluid-gauging system according to any one of claims 3 to 8, wherein said computing means provides said first representation of density D in accordance substantially with the following expression $$D = (K-1)/0.763(0.7 + 0.2(K-1))$$

where K is the permittivity of said fluid.

10. A fluid-gauging system according to any one of claims 1 to 8, wherein said means for providing a representation of the volume of fluid present in each said reservoir includes depth sensor means arranged to provide an output indicative of the depth of fluid in each said reservoir.

11. A fluid-gauging system according to claim 10, wherein said depth sensor means is capacitive sensor means.

12. A fluid-gauging system according to claim 11 including permittivity sensor means located in each said reservoir for providing a representation of the permittivity of fluid in each said reservoir, the said computing means modifying the said output of said capacitive sensor means in accordance with the permittivity of fluid in each said reservoir.

13. A fluid-gauging system for providing a representation of the mass of fluid present in a plurality of reservoirs, the system including: capacitive sensor means located in each said reservoir for providing an output representative of the depth of fluid in said reservoir; first permittivity sensor means located in each said reservoir for providing a first representation of the permittivity of fluid in each said reservoir; computing means receiving the output of said capacitive sensor means so as to provide a representation of the volume of fluid in each said reservoir, and the output of said permittivity sensor means so as to provide a first representation of the approximate density of fluid in each said reservoir; density sensor means and second permittivity sensor means located to receive a sample at least of all the fluid supplied to said reservoirs, said computing means deriving a second representation of density from said density sensor means and a third representation of density from said permittivity sensor means, said computing means including comparator means comparing said second and third density representations to derive a correction factor therefrom, said computing means including means for modifying each said first density representation by use of said correction factor so as thereby to obtain a more accurate representation of the density of fluid in each said reservoir; and means for deriving the mass of fluid in each said reservoir from said representations of volume and said more accurate representations of density.

14. A fluid-gauging system according to claim 13 including store means for storing a representation of a first correction factor and of the volume in respect of a first fluid supplied to said reservoirs; said computing means deriving a second correction factor and volume representation in respect of a second fluid supplied to said reservoirs; and said computing means including means deriving a third correction factor in respect of each said reservoir in accordance with the volumes of said first and second fluids in each said reservoir and their respective correction factors, and means for modifying each said density representation by use of said third correction factor.

* * * * *